No. 785,603. PATENTED MAR. 21, 1905.
J. J. FITZSIMMONS.
VEHICLE TIRE.
APPLICATION FILED SEPT. 24, 1904.
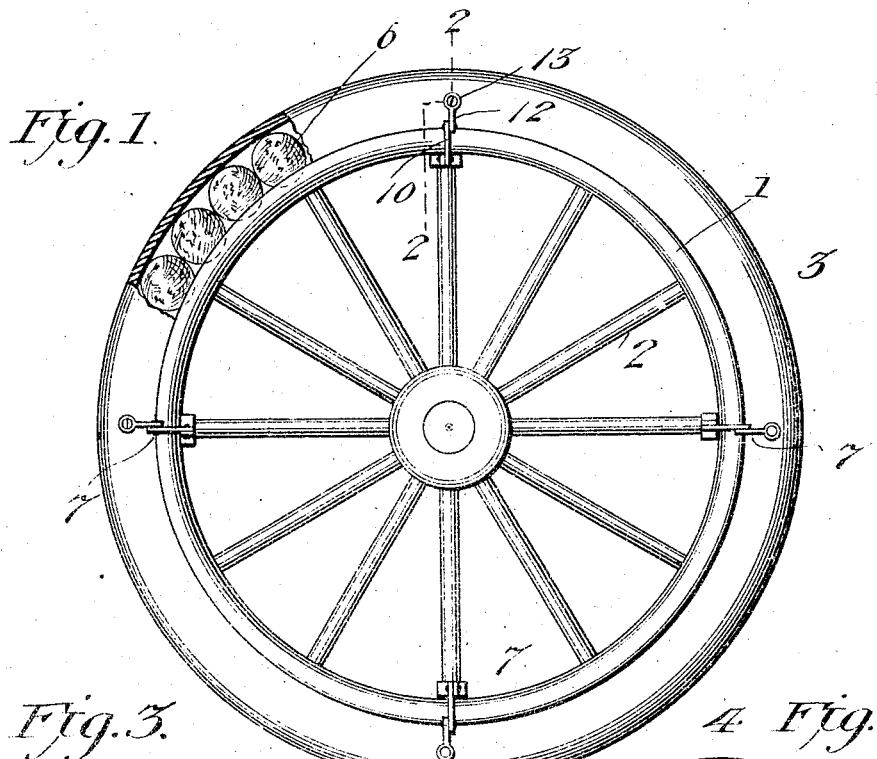
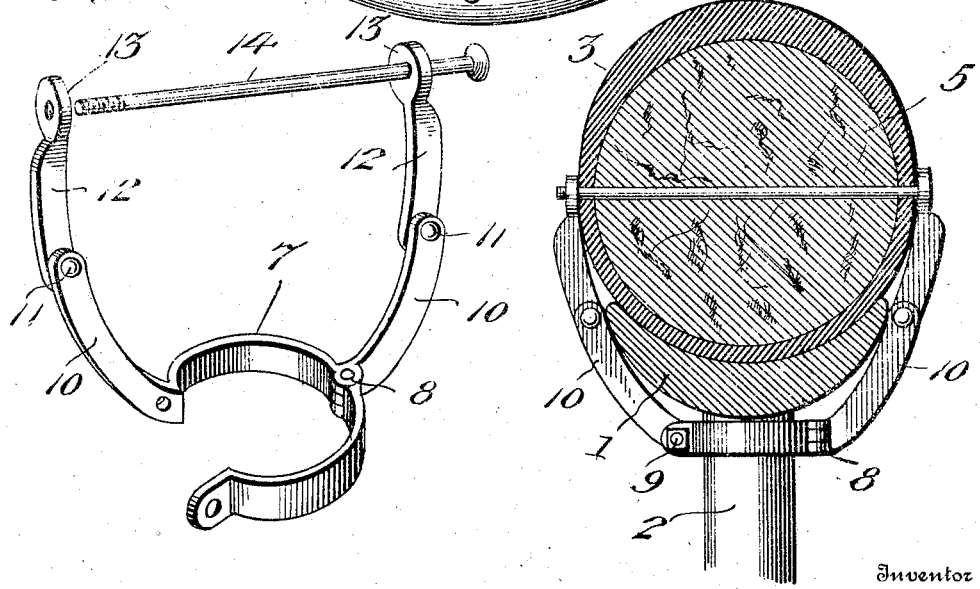
Witnesses
Geo. Ackman Jr.
F. S. Elmore
Inventor
John J. Fitzsimmons,
By Victor J. Evans
Attorney No. 785,603.

Patented March 21, 1905.

UNITED STATES PATENT OFFICE.

JOHN J. FITZSIMMONS, OF PATERSON, NEW JERSEY.

VEHICLE-TIRE.

SPECIFICATION forming part of Letters Patent No. 785,603, dated March 21, 1905.

Application filed September 24, 1904. Serial No. 225,819.

*To all whom it may concern:*

Be it known that I, JOHN J. FITZSIMMONS, a citizen of the United States, residing at Paterson, in the county of Passaic and State of New Jersey, have invented new and useful Improvements in Vehicle-Tires, of which the following is a specification.

This invention relates to vehicle-tires designed especially for use upon automobiles, motorcycles, and the like, and has for its objects to produce a simple efficient device of this character which will be absolutely nonpuncturable and which will at the same time be very light and resilient.

A further object of the invention is to provide an improved means for securing the tire in place upon the vehicle-rim, whereby it will be maintained firmly and securely in place and may be readily removed when circumstances require.

To these ends the invention comprises the novel features of construction and combination of parts more fully hereinafter described.

In the accompanying drawings, Figure 1 is a side elevation of a wheel having the improved tire applied thereto in accordance with my invention. Fig. 2 is a transverse sectional elevation taken on the line 2 2 of Fig. 1. Fig. 3 is a perspective view of one of the tire-fastening devices.

Referring to the drawings, 1 designates the wheel-rim, 2 the spokes, and 3 the tire, these parts, with the exception of the tire, being of the usual or any appropriate construction, inasmuch as they constitute no essential part of my invention.

The tire 3 in accordance with the invention comprises an outer tube or covering 4, preferably of rubber, and an inner filling or core 5 composed of cork, the tube 4 being preferably formed with a thick tread, thereby preventing breakage of the cork forming the core, and the latter being composed of a series of spherical sections or balls, as 6, arranged to contact with one another and to completely fill the tube 4. It is apparent from this construction that the tire will be exceedingly light and resilient and that the tube will be maintained in its distended condition by means of the core-filling tire, whereby the employment of air in the tire is dispensed with and liability of the tire being damaged by puncturing is wholly obviated. It is further obvious that owing to the core-sections being of spherical form they will yield more readily during the travel of the tire over the ground or, in other words, that this particular shape permits them to expand or contract freely within the tube, while the thickened tread, as before stated, obviates liability of the cork becoming damaged or broken while the tire is in use.

The tire is held securely in position upon the rim 1 by means of my improved fastening devices, which are identical in construction and operation, and but one of which will therefore be described in detail, in which 7 designates a clip composed of a fixed and a movable section, each of semicircular form and adapted conjointly to embrace the spoke 2 at a point intermediate the inside of the rim 1, these sections being pivotally connected, as at 8, whereby the movable section may be turned for detaching the device from the spoke and is secured in engaging position by means of a removable bolt or analogous fastening device 9. Formed integral with and arising from the fixed section of the clip or collar is a pair of oppositely-disposed upwardly-divergent arms 10, having pivoted to their upper ends by means of rivets 11 movable links 12, terminating at their outer ends in perforated ears or heads 13 for the reception of a retaining element or bolt 14, designed to pass transversely through the tire 3 and centrally of one of the core-sections 6. This bolt or element is provided at one end with a suitable head and has its other end threaded for secure engagement with the adjacent perforated ear or head 13.

In practice the clip or collar 7 is secured upon the spoke, as illustrated in Fig. 2, with the arms 10 projecting outwardly upon opposite sides of the rim 1. The links are then moved to position for the heads 13 to bear upon the sides of the tire at diametrically opposite points, and the bolt or element 14 is passed through the latter and secured in place, as heretofore explained, it being mentioned in this connection that such parts of the links 12 as come in contact with the tire may in practice be lined with felt or other soft material to prevent damage to the rubber tube 4.

It will be seen from the foregoing that I produce a simple efficient device admirably adapted for the attainment of the ends in view and one wherein the tire will be held securely in position upon the rim, it being understood that changes in the details of construction herein set forth may be resorted to without departing from the spirit of the invention.

Having thus described the invention, what is claimed as new is—

1. The combination with a tire having an outer tube and an inner core, of a clamp adapted to engage a wheel-spoke, a retaining element designed to extend transversely through the tire, and connections between the retaining element and clamp.

2. A tire-fastening device comprising a clamp, a pair of arms carried thereby, links pivotally connected with the arms and having perforated heads, and an element extended between the heads and adapted to pass transversely through the tire.

3. A tire-fastening device comprising a clamp composed of a fixed and a relatively movable section, a pair of oppositely-disposed outwardly-divergent arms carried by the fixed section, links pivotally connected respectively with the arms and terminating in perforated heads, and an element adapted to pass transversely through the tire and be engaged with the heads.

In testimony whereof I affix my signature in presence of two witnesses.

JOHN J. FITZSIMMONS.

Witnesses:
CLIFFORD L. NEWMAN,
FRED S. DORL.